(12) United States Patent
Jitsui et al.

(10) Patent No.: US 11,366,353 B2
(45) Date of Patent: Jun. 21, 2022

(54) ELECTRONIC DEVICE

(71) Applicant: InnoLux Corporation, Miao-Li County (TW)

(72) Inventors: Kazuto Jitsui, Miao-Li County (TW); Satoru Takahashi, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 379 days.

(21) Appl. No.: 16/519,014

(22) Filed: Jul. 23, 2019

(65) Prior Publication Data

US 2021/0026194 A1    Jan. 28, 2021

(51) Int. Cl.
*G02F 1/1335* (2006.01)
*G02F 1/13357* (2006.01)
*G02F 1/1343* (2006.01)
*G02F 1/13363* (2006.01)

(52) U.S. Cl.
CPC ...... *G02F 1/133528* (2013.01); *G02F 1/1336* (2013.01); *G02F 1/13363* (2013.01); *G02F 1/13439* (2013.01); *G02F 1/134309* (2013.01); *G02F 1/13356* (2021.01); *G02F 1/133531* (2021.01); *G02F 1/133638* (2021.01); *G02F 2413/05* (2013.01)

(58) Field of Classification Search
None
See application file for complete search history.

(56) References Cited

U.S. PATENT DOCUMENTS

| | | | | |
|---|---|---|---|---|
| 2018/0113334 A1* | 4/2018 | Fang | ...................... | G02F 1/1323 |
| 2020/0218101 A1* | 7/2020 | Ihas | ...................... | G02B 6/0053 |
| 2020/0326567 A1* | 10/2020 | Fang | ................. | G02F 1/133528 |

FOREIGN PATENT DOCUMENTS

CN    1702517    11/2005

\* cited by examiner

*Primary Examiner* — Nathanael R Briggs
(74) *Attorney, Agent, or Firm* — Winston Hsu (57) ABSTRACT

An electronic device includes a backlight module, a display panel disposed on the backlight module, a viewing angle adjusting unit disposed on the backlight module, and a retardation structure disposed on the backlight module. The viewing angle adjusting unit includes a first viewing angle adjusting subunit and a second viewing angle adjusting subunit, and the first viewing angle adjusting subunit is disposed between the backlight module and the second viewing angle adjusting subunit.

17 Claims, 11 Drawing Sheets

ELECTRONIC DEVICE

BACKGROUND OF THE DISCLOSURE

1. Field of the Disclosure

The present disclosure relates generally to an electronic device, and more particularly, to an electronic device with adjustable viewing angles.

2. Description of the Prior Art

Electronic device with display panels, such as smart phones, tablets, notebooks computers, monitors, and TVs, have become indispensable necessities to modern people no matter in their work, study or entertainment. With a flourishing development of the portable electronic devices, the consumers not only pursue better electronic characteristics such as higher display quality, higher speed of response, longer life span or higher reliability, but also have higher expects on the functions of the products to be more diversified.

SUMMARY OF THE DISCLOSURE

In some embodiments, the present disclosure provides an electronic device including a backlight module, a display panel disposed on the backlight module, a viewing angle adjusting unit disposed on the backlight module, and a retardation structure disposed on the backlight module. The viewing angle adjusting unit includes a first viewing angle adjusting subunit and a second viewing angle adjusting subunit, and the first viewing angle adjusting subunit is disposed between the backlight module and the second viewing angle adjusting subunit.

In some embodiments, the present disclosure provides an electronic device including a display panel, a viewing angle adjusting unit, and a retardation structure. The viewing angle adjusting unit is disposed on the display panel, where the viewing angle adjusting unit includes a first viewing angle adjusting subunit and a second viewing angle adjusting subunit disposed on the first viewing angle adjusting subunit. The retardation structure is disposed on the display panel.

These and other objectives of the present disclosure will no doubt become obvious to those of ordinary skill in the art after reading the following detailed description of the embodiment that is illustrated in the various figures and drawings.

DETAILED DESCRIPTION

The present disclosure may be understood by reference to the following detailed description, taken in conjunction with the drawings as described below. It is noted that, for purposes of illustrative clarity and being easily understood by the readers, various drawings of this disclosure show a portion of the electronic device, and certain elements in various drawings may not be drawn to scale. In addition, the number and dimension of each device shown in drawings are only illustrative and are not intended to limit the scope of the present disclosure.

Certain terms are used throughout the description and following claims to refer to particular components. As one skilled in the art will understand, electronic equipment manufacturers may refer to a component by different names. This document does not intend to distinguish between components that differ in name but have the same function. In the following description and in the claims, the terms "include", "comprise" and "have" are used in an open-ended fashion, and thus should be interpreted to mean "include, but not limited to".

It will be understood that when an element or layer is referred to as being "on" or "connected to" another element or layer, it can be directly on or directly connected to the other element or layer, or intervening elements or layers may be presented. In contrast, when an element is referred to as being "directly on" or "directly connected to" another element or layer, there are no intervening elements or layers present.

It should be noted that the technical features in different embodiments described in the following can be replaced, recombined, or mixed with one another to constitute another embodiment without departing from the spirit of the present disclosure.

The terms "appropriate" and "substantially" as used herein are inclusive of the stated value and means within an acceptable range of deviation for the particular value as determined by one of ordinary skill in the art, considering the measurement in question and the error associated with measurement of the particular quantity (i.e., the limitations of the measurement system). For example, "substantially" can mean within one or more standard deviations, or within ±20%, ±15%, ±10%, ±5%, ±3% of the stated value. It is noted that the term "same" may also refer to "about" because of the process deviation or the process fluctuation.

An electronic device may switch between a normal mode and a private mode. The normal mode of the electronic device may permit the displayed data to be viewed by people within a wide viewing angle. The private mode of the electronic device may allow the displayed data to be clearly viewed by people within a narrower viewing angle. In some examples, the private mode may include a symmetric mode and/or an asymmetric mode.

Figure 1:
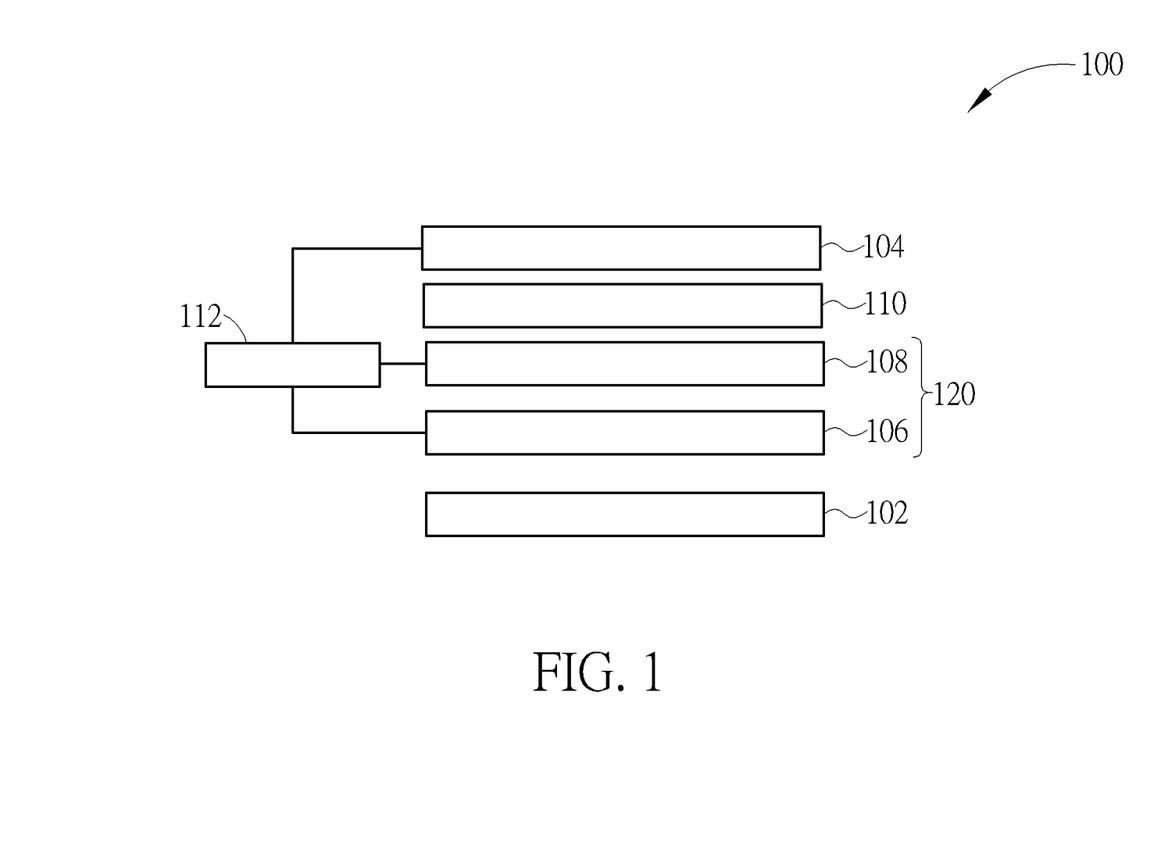
FIG. 1 is a schematic diagram of an electronic device with adjustable viewing angles according to a first embodiment of the present disclosure.

Referring to FIG. 1, FIG. 1 is a schematic diagram of an electronic device with adjustable viewing angles according to a first embodiment of the present disclosure. An electronic device 100 may include a backlight module 102, a display panel 104 disposed on the backlight module 102, a viewing angle adjusting unit 120 disposed on the backlight module 102, a retardation structure 110 disposed on the backlight module 102, and at least a controller 112 electrically coupled to the display panel 104 and the viewing angle adjusting unit 120. In one example, as shown in FIG. 1, the viewing angle adjusting unit 120 may be disposed on the backlight module 102. The retardation structure 110 may be disposed on the viewing angle adjusting unit 120. The display panel 104 may be disposed on the retardation structure 110.

The viewing angle adjusting unit 120 may further include at least two viewing angle adjusting subunits, such as a viewing angle adjusting subunit 106 (also called a privacy cell) and a viewing angle adjusting subunit 108 (also called a privacy cell). The display panel 104 may include display elements such as liquid crystals (LC), organic light-emitting diodes (OLED), quantum dots (QD), inorganic light-emitting diodes (LED), such as mini light-emitting diodes (mini LED) or micro light-emitting diodes (micro LED), quantum dot light-emitting diodes (QLED or QDLED), phosphors, fluorescence, other display elements, or a combination thereof, and is not limited thereto. In one example, the retardation structure 110 may be omitted. Each of the viewing angle adjusting subunits 106 and 108 may include a modulating layer, such as a LC layer, and a polarizer may be disposed between the two modulating layers. The viewing angle adjusting unit 120 may further include a bottom polarizer disposed close to the backlight module 102 and a top polarizer disposed away from the backlight module 102. The azimuthal angle between a polarization axis of the polarizer disposed between the two modulating layers and the polarization axis of the bottom polarizer is 90 degrees or −90 degrees.

In one embodiment, the viewing angle of the electronic device 100 may be adjusted by applying a suitable voltage or voltage signal to the viewing angle adjusting unit 120. For example, when the electronic device 100 is at the normal mode, there may be no voltage applied to at least one of the viewing angle adjusting subunits 106 and 108. Thus, the viewing angle of the electronic device 100 is relatively wide. In contrast, when the electronic device 100 is at the private mode, there may be a voltage applied to at least one of the viewing angle adjusting subunits 106 and 108. In some examples, the viewing angle adjusting subunit 106 may receive a voltage different from or the same as a voltage received by the viewing angle adjusting subunit 108. Thus, the viewing angle of the electronic device 100 may be relatively narrow. Besides, the viewing angle of the electronic device 100 may also be further adjusted by adjusting the amplitude of the voltage applied to the electronic device 100. For example, the viewing angle of the electronic device 100 may be reduced when the voltage applied to the viewing angle adjusting subunits 106 and 108 is increased, but not limited thereto.

Figure 10A:
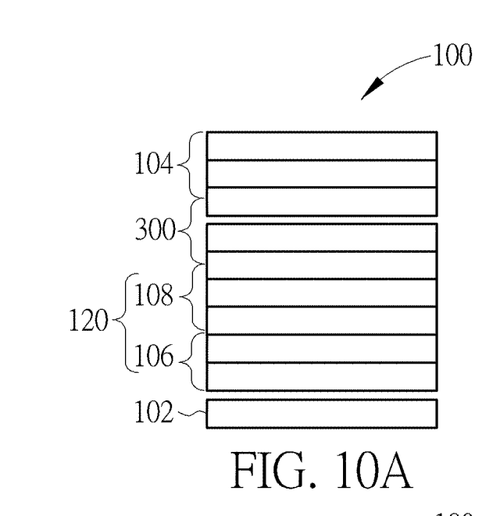
FIG. 10A is a schematic cross-sectional diagram of an electronic device with adjustable viewing angles according to a ninth embodiment of the present disclosure.
Figure 10B:
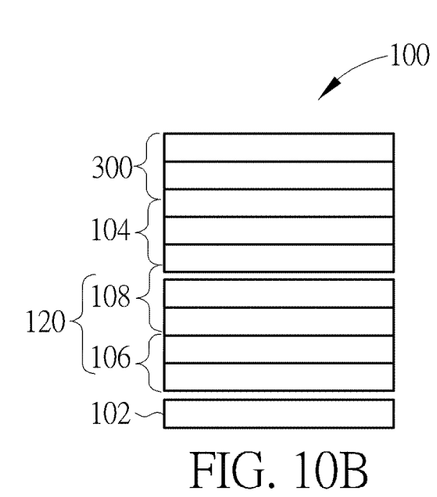
FIG. 10B is a schematic cross-sectional diagram of an electronic device with adjustable viewing angles according to a ninth embodiment of the present disclosure.
Figure 11A:
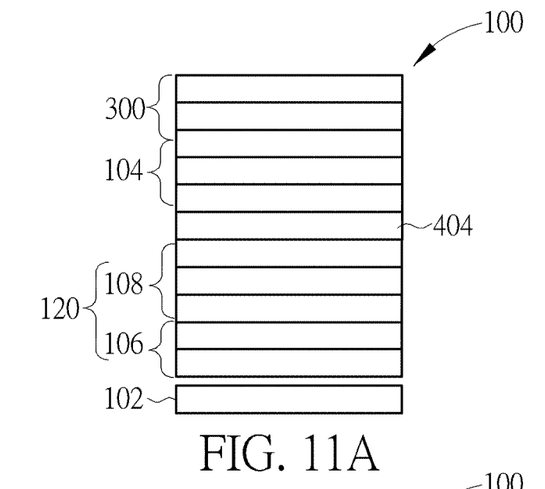
FIG. 11A is a schematic cross-sectional diagram of an electronic device with adjustable viewing angles according to a tenth embodiment of the present disclosure.

The retardation structure 110 may be a wave plate, but not limited thereto. In one example, the in-plane retardation ($R_o$) of the retardation structure 110 may be in a range from 100 nanometers (nm) to 350 nm (100 nm≤$R_o$≤350 nm), and the out-of-plane retardation ($R_{th}$) of the retardation structure 110 may be in a range from 0 to 1000 nm (0 nm≤$R_{th}$≤1000 nm), but not limited thereto. The retardation structure 110 may be disposed between two polarizers (shown in FIGS. 10 and 11). The controller 112 may be used to apply suitable signal (s), such as current signal or voltage signal, to the display panel 104 and the viewing angle adjusting unit 120. Besides, there may be two polarizers respectively disposed on opposite surfaces of the retardation structure 110.

Figure 2A:
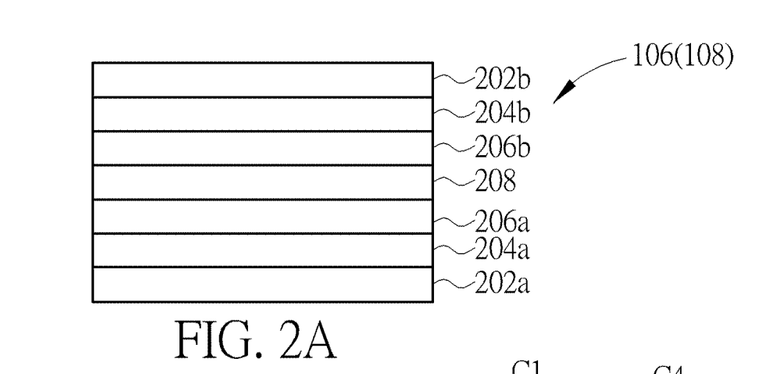
FIG. 2A is a schematic diagram of a viewing angle adjusting subunit according to a first embodiment of the present disclosure.

FIG. 2A is a schematic diagram of a viewing angle adjusting subunit according to a first embodiment of the present disclosure. Referring to FIG. 2A, at least one of the viewing angle adjusting subunits 106 and 108 may include substrates 202a and 202b, transparent electrodes 204a and 204b, alignment layers 206a and 206b, and a modulating layer 208. The substrate 202a may be disposed opposite to the substrate 202b. The transparent electrodes 204a and 204b may be disposed between the substrate 202a and 202b. The alignment layers 206a and 206b may be disposed between the transparent electrodes 204a and 204b. The modulating layer 208 may be disposed between the two alignment layers 206a and 206b, but not limited thereto.

In one embodiment, the substrates 202a and 202b may be transparent substrates, and the inner surfaces of the substrates 202a and 202b may be coated or deposited with the transparent electrodes 204a and 204b. At least one of the transparent electrodes 204a and 204b may be a layer of transparent conductive film, and the material of the transparent conductive film may include indium tin oxide (ITO), indium zinc oxide (IZO), and so forth. The modulating layer 208 may include liquid crystal molecules, and the orientation of the liquid crystal molecules may be defined by the characteristics of the liquid crystal molecules and the patterns of the alignment layers 206a and 206b. The orientation of the liquid crystal molecules in the modulating layer 208 may be changed when a suitable voltage difference is applied across the modulating layer 208. Therefore, the viewing angle of the electronic device may be adjusted by applying a suitable voltage difference across the modulating layer 208. Besides, the orientation types of the liquid crystal molecules in the modulating layer 208 may include untwisted nematic, twisted nematic (TN), super-twisted nematic (STN), vertically aligned nematic (VAN), twisted vertically aligned nematic (TVAN) and hybrid aligned nematic (HAN). However, liquid crystal molecules other than nematic materials may also be used.

Figure 2B:
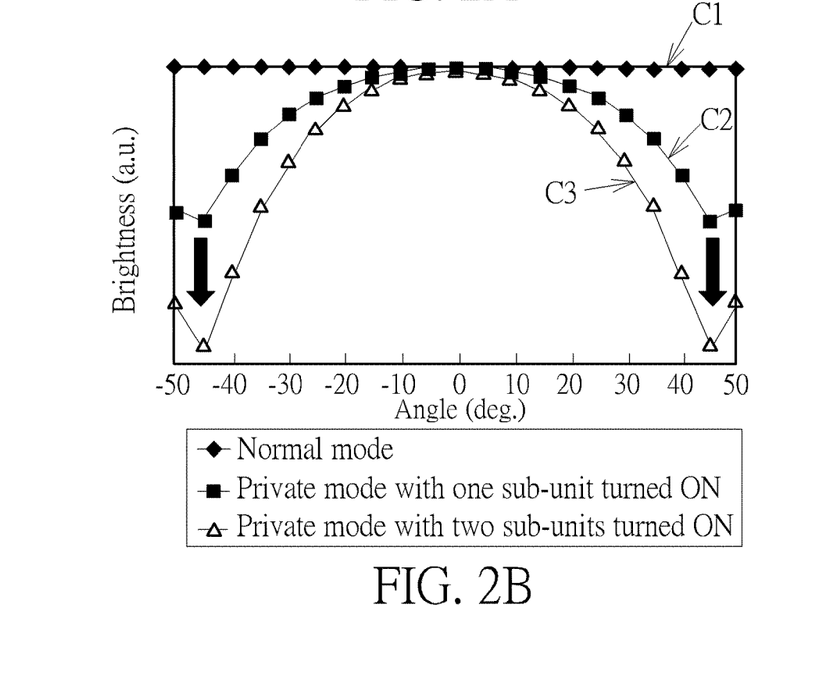
FIGS. 2B and 2C respectively show experiment results of electronic device with symmetric mode or asymmetric mode according to a first embodiment of the present disclosure.
Figure 2C:
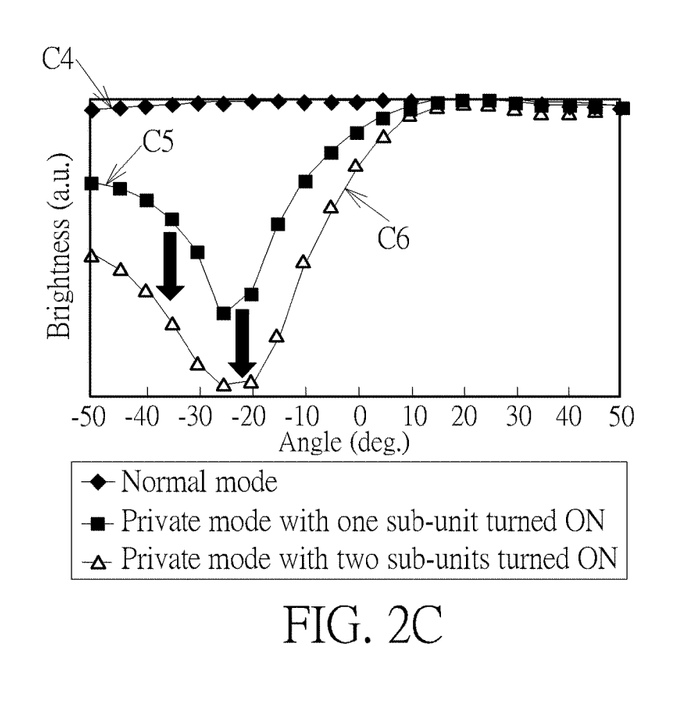

FIG. 2B and FIG. 2C respectively show experiment results of the electronic device with symmetric mode or asymmetric mode according to a first embodiment of the present disclosure. FIG. 2B shows an experiment result of an electronic device 100 with symmetric mode where the brightness distribution in different viewing angles of the electronic device 100 may be substantially symmetric. Referring to the curve C1 in FIG. 2B, when there may be no voltage difference applied across at least one of the modulating layers 208 of the viewing angle adjusting subunits 106 and 108, i.e. viewing angle adjusting unit 120 being at off-state, the electronic device 100 may have a wide brightness distribution. Referring to the curve C2 in FIG. 2B, when one of the viewing angle adjusting subunits 106 and 108 is turned on, the brightness at some viewing angles of the electronic device 100 may become lower compared with that of the curve C1. For example, the brightness of the curve C2 at the viewing angle of 0° may be similar to the brightness of the curve C1, while the brightness of the curve C2 at the viewing angles other than 0° may be darker than the brightness of the curve C1. Specifically, the curve C2 may have two troughs approximately at the viewing angles of approximately −45° and 45°. Furthermore, referring to the curve C3 in FIG. 2B, when the viewing angle adjusting subunits 106 and 108 are turned on, the brightness of the curve C3 at the viewing angle of 0° may be similar to the brightness of the curve C1. However, the brightness of the troughs of the curve C3 may be darker than the corresponding troughs of the curve C2, and the brightness distribution of the electronic device 100 may become even narrower compared with the brightness distribution of the curve C2. Therefore, the experiment data shows that the brightness distribution of the electronic device 100 with the symmetric mode may become relatively narrow by turning on at least one of the viewing angle adjusting subunits 106 and 108. In some examples, in the symmetric mode, when the viewing angle adjusting unit 120 (may include the viewing angle adjusting subunit 106 and/or the viewing angle adjusting subunit 108) is turned on, the brightness of the viewing angle of 0° may be defined as a first brightness, and the brightness of the viewing angles out of −45° to 45° (i.e. angle >45° and angle<−45°), such as −50°, −60°, 50°, or 60°, may be defined as a second brightness. The ratio of the second brightness to the first brightness may be in a range from 0% to 1%, such as 0.5% or 0.75%, but not limited thereto.

FIG. 2C shows an experiment result of an electronic device with asymmetric mode. Referring to the curve C4 in FIG. 2C, when there is no voltage difference applied across at least one of the modulating layers 208 of the viewing angle adjusting subunits 106 and 108, the electronic device 100 may have an substantially uniform brightness distribution. In contrast, referring to the curve C5 in FIG. 2C, when at least one of the viewing angle adjusting subunits 106 and 108 is turned on, the brightness distribution of the electronic device 100 may become narrower compared with the brightness distribution of the curve C4. Specifically, the brightness of the curve C5 at the viewing angle greater than 15° may be similar to the brightness of the curve C4, while the brightness of the curve C5 at the viewing angles less than 15° may be darker than the brightness of the curve C4. Specifically, the curve C5 may have a trough at the viewing angle of approximately −25°. Furthermore, referring to the curve C6 in FIG. 2C, when the viewing angle adjusting subunits 106 and 108 are turned on, the brightness of the curve C6 at the viewing angle greater than 15° may be similar to the brightness of the curve C4. However, the brightness of the trough of the curve C6 may be darker than the corresponding troughs of the curve C5, and the brightness distribution of the electronic device 100 may become even narrower compared with the brightness distribution of the curve C5. Therefore, the experiment data also shows that the brightness distribution of the electronic device 100 with asymmetric mode may become relatively narrow by turning on at least one of the viewing angle adjusting subunits 106 and 108.

Figure 3A:
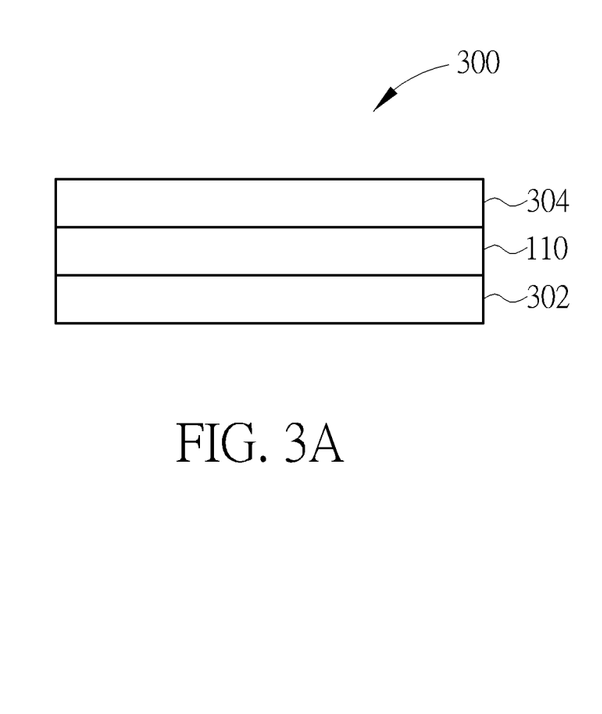
FIG. 3A is a schematic diagram of a light restriction film according to a second embodiment of the present disclosure.

FIG. 3A is a schematic diagram of a light restriction film (LRF) according to a second embodiment of the present disclosure. A light restriction film (LRF) 300 may be a stacked structure including the polarizer 302, the polarizer 304, and the retardation structure 110 disposed between the two polarizers 302 and 304. The polarization axes of the polarizers 302 and 304 may be substantially parallel, vertical, or at specific angles, but are not limited thereto.

Figure 3B:
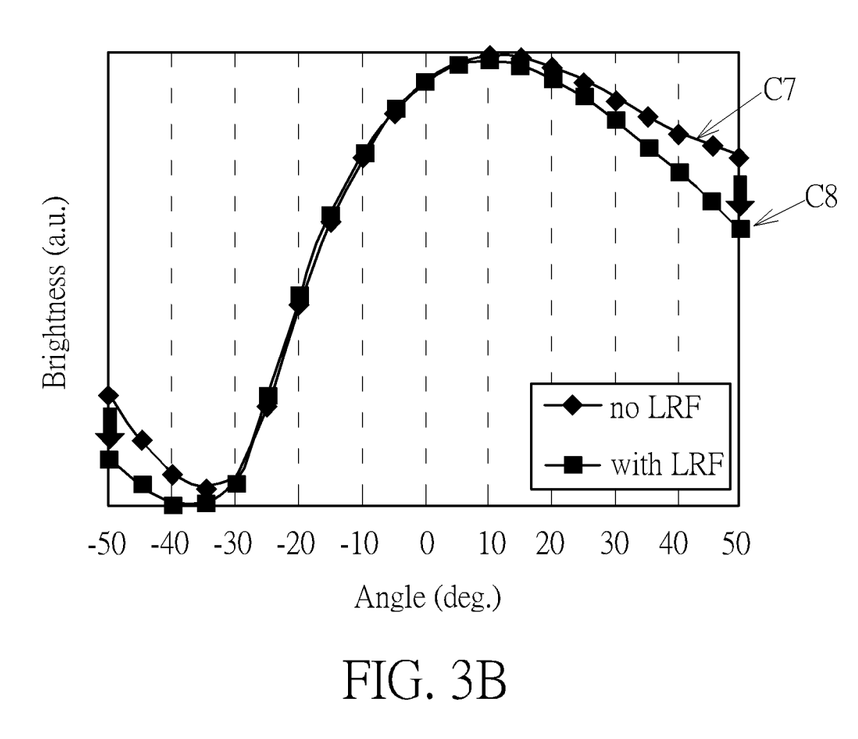
FIG. 3B shows an experiment result of an electronic device equipped with or without a retardation structure according to a second embodiment of the present disclosure.

FIG. 3B shows an experiment result of an electronic device with or without a light restriction film according to a second embodiment of the present disclosure. Referring to the curve C7 and the curve C8 in FIG. 3B, two electronic devices having structures similar to the electronic device 100 shown in FIG. 1 are operated to respectively generate the brightness distribution as shown in the curve C7 and the curve C8. However, the electronic device corresponding to the curve C7 is without the light restriction film 300. According to the experiment result, for the electronic device 100 with the light restriction film 300, the trough of the curve C8 may be further shifted downwardly compared with the trough of the curve C7. Also, the curve C7 may be similar to the curve C8 in the range from the viewing angle −30° to the viewing angle 5°. Besides, the retardation structure 110 or the light restriction film 300 may enhance the brightness of the electronic device 100 or decrease the occurrence of the undesirable moiré pattern.

Figure 4A:
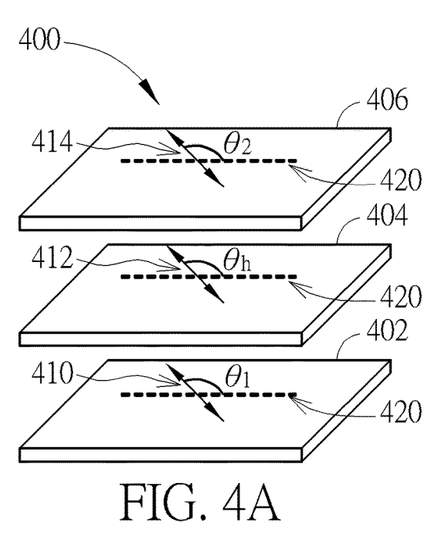
FIG. 4A is a schematic diagram of an electronic device equipped with a half-wave plate according to a third embodiment of the present disclosure.

FIG. 4A is schematic diagram of electronic device with a half-wave plate according to third embodiment of the present disclosure. The electronic device 400 shown in FIG. 4A may include the electronic device 100 shown in FIG. 1 and an additional half-wave plate 404. The retardation of the half-wave plate may be in a range from 200 nm to 350 nm. According to present embodiment, referring to FIG. 4A, the half wave plate 404 may be disposed between the polarizers 402 and 406, and the relationship among them may be represented as follows:

$$\Theta_h=[(\Theta_1+\Theta_2)/2]+(0° \text{ or } 90°)\pm10° \quad (1)$$

where $\Theta_h$ represents an azimuthal angle between a slow axis 412 of the half-wave plate 404 and a reference orientation 420; $\Theta_1$ represents an azimuthal angle between a polarization axis 410 of a polarizer 402 of the viewing angle adjusting unit 120 (such as a top polarizer of the viewing angle adjusting unit 120) and the reference orientation 420; and $\Theta_2$ represents an azimuthal angle between a polarization axis 414 of a polarizer 406 of the display panel 104 (such as a bottom polarizer of the display panel 104) and the reference orientation 420.

Figure 4B:
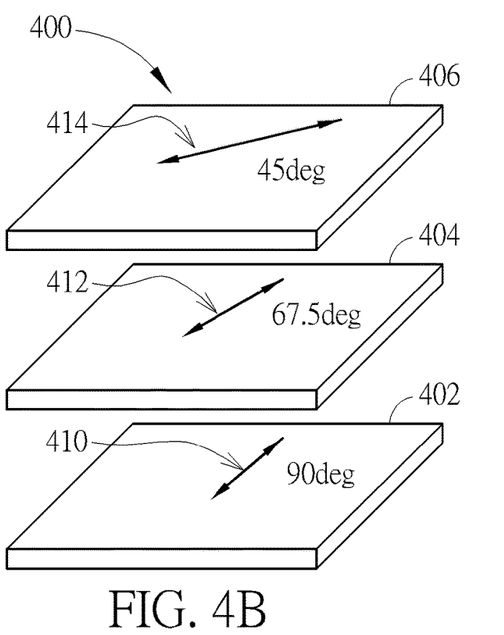
FIG. 4B is a schematic diagram showing the relationship among a half-wave plate and polarizers respectively disposed above and under the half-wave plate according to a third embodiment of the present disclosure.
Figure 4C:
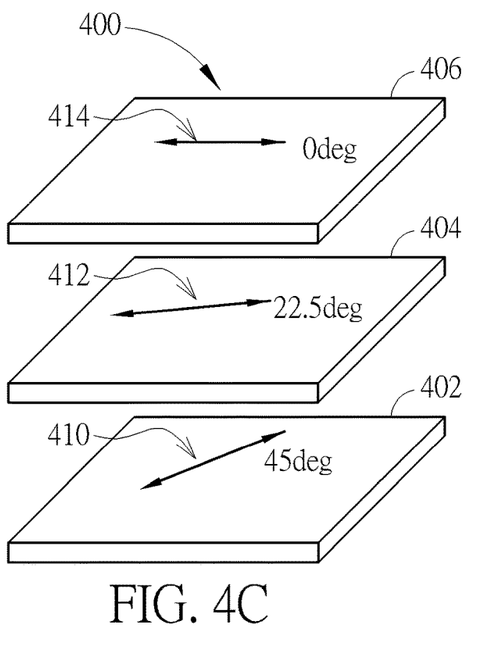
FIG. 4C is a schematic diagram showing the relationship among a half-wave plate and polarizers respectively disposed above and under the half-wave plate according to a third embodiment of the present disclosure.
Figure 4D:
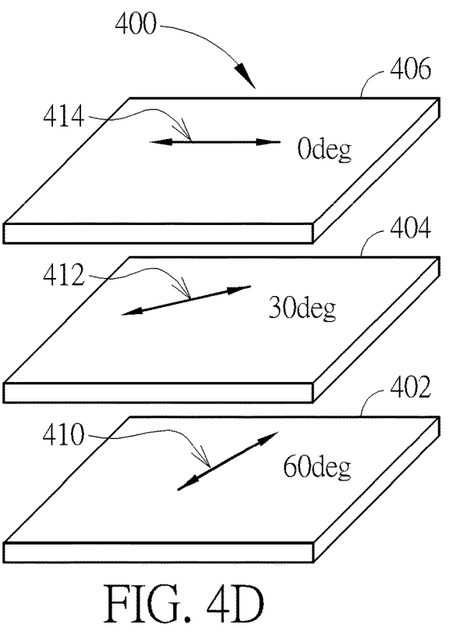
FIG. 4D is a schematic diagram showing the relationship among a half-wave plate and polarizers respectively disposed above and under the half-wave plate according to a third embodiment of the present disclosure.

FIG. 4B to FIG. 4D are schematic diagrams showing the relationship among a half-wave plate and the polarizers according to a third embodiment of the present disclosure. For example, the azimuthal angles $\Theta_1$, $\Theta_2$, and $\Theta_h$ with respect to the reference orientation 420 for the polarizer 402, the polarizer 406, and the half-wave plate 404 may be one of the sets of values: (1) 90°, 67.5°, and 45° (corresponding to FIG. 4B); (2) 45°, 22.5°, and 0° (corresponding to FIG. 4C); and (3) 60°, 30°, and 0° (corresponding to FIG. 4D). It should be noted that the values depicted in sets (1) to (3) above are only examples, and there may be other suitable sets of values so long as the equation (1) is satisfied.

Figure 5:
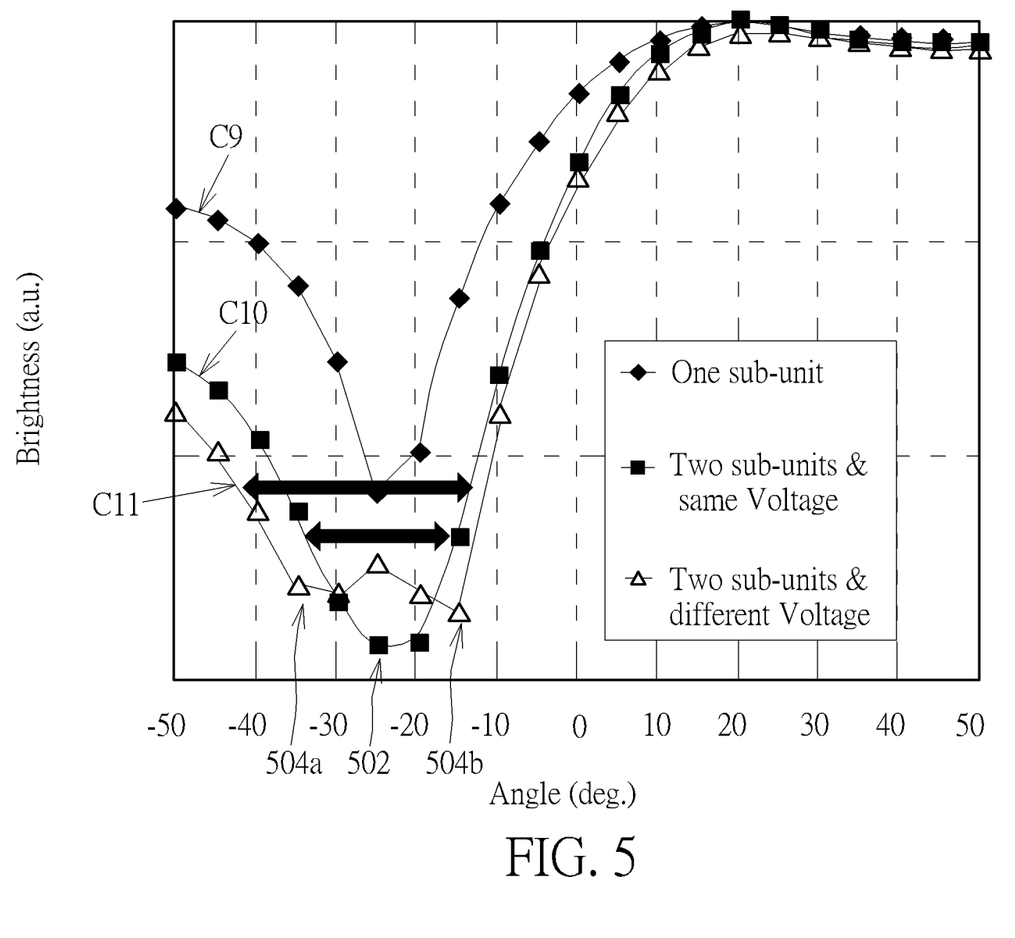
FIG. 5 shows an experiment result of electronic device respectively equipped with one or two viewing angle adjusting subunits according to a fourth embodiment of the present disclosure.

FIG. 5 shows an experiment result of electronic device respectively with one or two viewing angle adjusting subunits according to a fourth embodiment of the present disclosure. Referring to FIG. 5, the curve C9 corresponds to the brightness distribution of the electronic device with one viewing angle adjusting subunit 106 or 108 (shown in FIG. 1), while the curves C10 and C11 respectively corresponds to the brightness distribution of the electronic device with viewing angle adjusting subunits 106 and 108. Referring to FIG. 5, the brightness of the curves C10 and C11 substantially within the viewing angles of 10° to −50° may be less than the brightness of the curve C9 at the corresponding viewing angles. Furthermore, referring to the curve C10, when the viewing angle adjusting subunits 106 and 108 may receive substantially the same voltage signal, the trough 502 of the curve C10 may have the lowest brightness compared with the troughs of the curves C9 and C11. Referring to the curve C11, when the viewing angle adjusting subunits 106 and 108 are respectively received two different voltage signals (such as a high-voltage signal and a low voltage signal), there may be two troughs 504a and 504b in the curve C11. In one example, the curve C11 may be regarded as a superimposed curve including two brightness distribution curves respectively from viewing angle adjusting subunits 106 and 108. The trough of the brightness distribution curve may be shifted laterally and downwardly along with the increase in the voltage signal applied to one of the viewing angle adjusting subunits 106 and 180. Therefore, the brightness distribution of the curve C11 may have two troughs 504a and 504b. Accordingly, the position of trough 504a may be attributed to the viewing angle adjusting subunit receiving relatively low voltage signal, while the trough 504b may be attributed to the trough of the viewing angle adjusting subunit receiving relatively high voltage signal.

Figure 6:
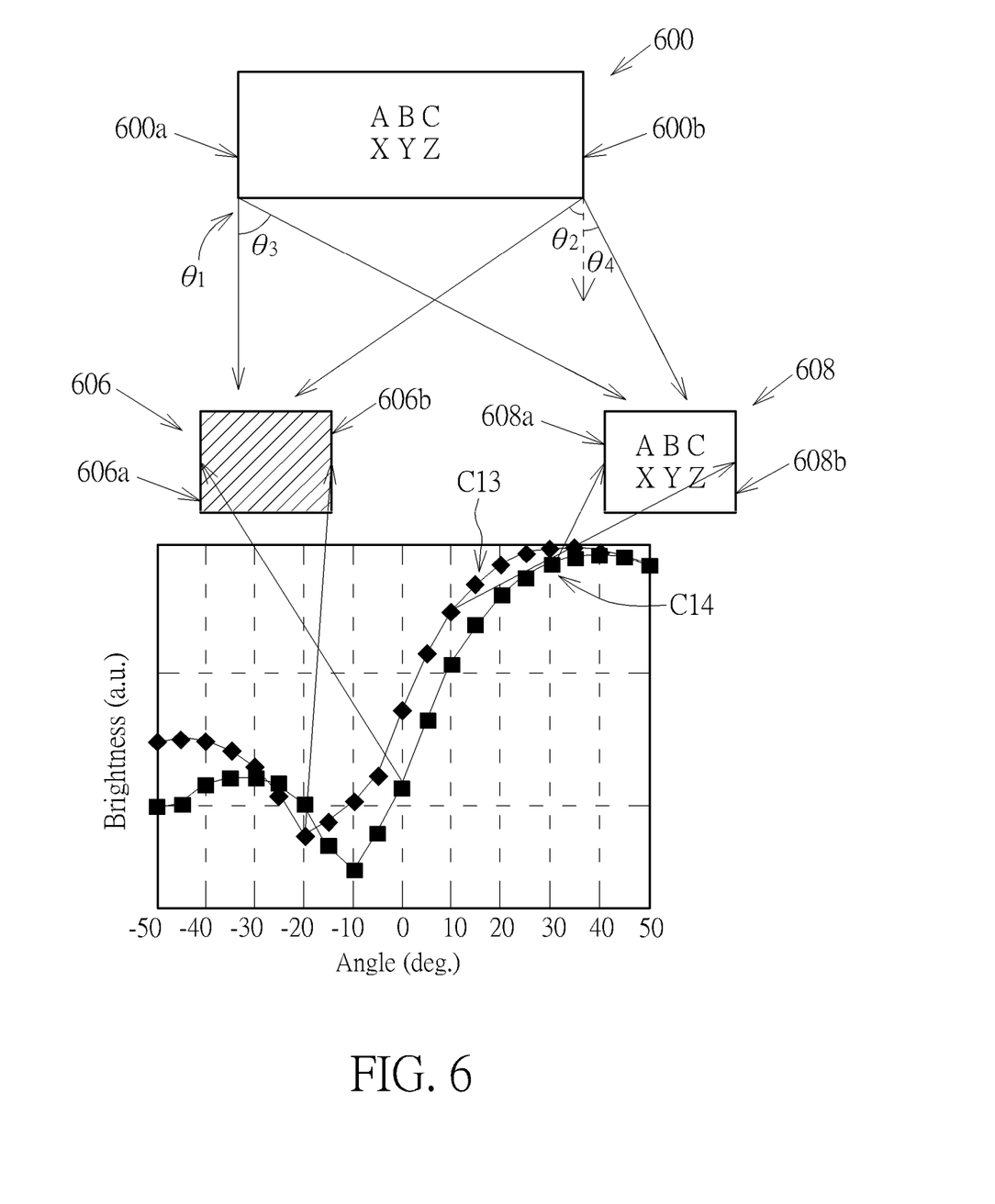
FIG. 6 shows an experiment result of an electronic device where two lateral ends of a viewing angle adjusting unit are applied different voltages according to a fifth embodiment of the present disclosure.

FIG. 6 shows an experiment result of an electronic device where at least one of two opposite ends of a viewing angle adjusting subunit are applied different voltages according to a fifth embodiment of the present disclosure. An electronic device 600 similar to the electronic device 100 shown in FIG. 1 is disclosed and may be used to display images with different brightness for the viewers at different locations or viewing angles. Specifically, the voltage difference across the modulating layer of the viewing angle adjusting subunit may be reduced from the left-hand side 600a of the electronic device 600 to the right-hand side 600b of the electronic device 600. For example, for a displayed image 606, the left-hand side image 606a of the displayed image 606 is displayed by the electronic device 600 at a angle $\Theta_1$. As shown in FIG. 6, the voltage difference of the left-hand side 600a of the curve C13 is less than the voltage difference of the left-hand side 600a of the curve C14. When the angle $\Theta_1$ substantially equals 0°, the left-hand side image 606a may correspond to a point with a viewing angle of 0° of the curve C14. Similarly, the right-hand side image 606b of the displayed image 606 is displayed by the electronic device 600 at a angle $\Theta_2$, such as −20°, and may correspond to a point with a viewing angle of −20° of the curve C13. For the curves C13 and C14 within the range of the viewing angles from 0° to −20°, the corresponding brightness is relatively low. Besides, the brightness of the curve C14 at the angle $\Theta_1$ of 0° is lower than the brightness of the curve C13 at substantially the same angle $\Theta_1$, while the brightness of the curve C13 at the angle $\Theta_2$ of −20° is lower than the brightness of the curve C14 at the same angle $\Theta_2$. Therefore, the displayed image 606 may be darker when the voltage difference across the modulating layer of the viewing angle adjusting subunit is reduced from one lateral side to the other lateral side.

In contrast, for a displayed image 608, the displayed image 608 may be observed clearly by the viewer. Specifically, the left-hand side image 608a of the displayed image 608 may be displayed from the electronic device 600 at an angle $\Theta_3$. For example, when the angle $\Theta_3$ substantially equals 30°, the left-hand side image 608a may correspond to a point on the curve C14 with an angle of 30°. Similarly, the right-hand side image 608b of the displayed image 608 may be displayed from the electronic device 600 at an angle $\Theta_4$, such as 10°, and may correspond to a point on the curve C13 with a viewing angle of 10°. For the points on the curves C13 and C14 within the viewing angles in a range from 10° to 50°, the corresponding brightness may be relatively high. Besides, the brightness of the curve C13 at the angle $\Theta_4$ of 10° is higher than the brightness of the curve C14 at the same angle $\Theta_4$. Therefore, the displayed image 608 may be brighter when the voltage difference across the modulating layer of the viewing angle adjusting subunit is reduced from one lateral side to the other lateral side.

Figure 7A:
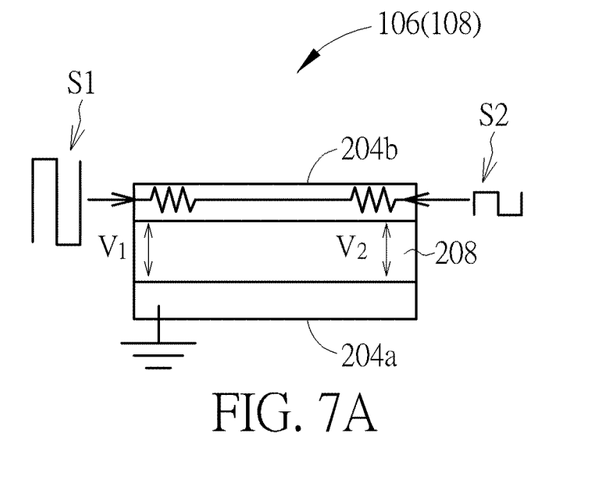
FIG. 7A is a schematic cross-sectional diagram of a viewing angle adjusting subunit according to a sixth embodiment of the present disclosure.
Figure 7B:
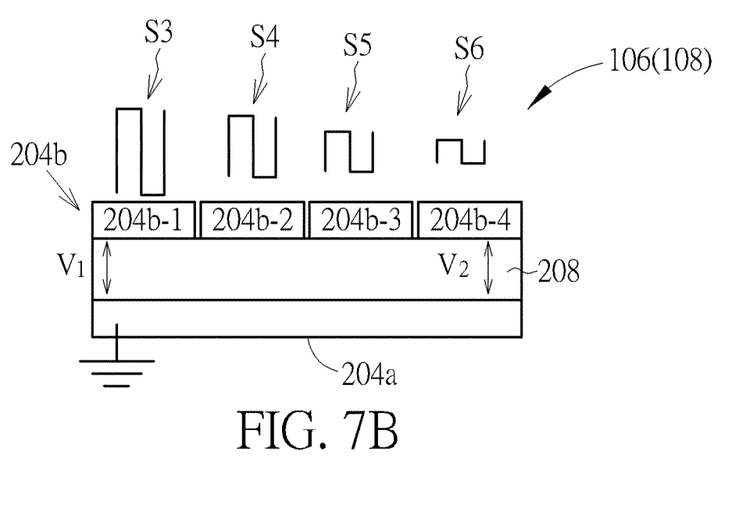
FIG. 7B is a schematic cross-sectional diagram of a viewing angle adjusting subunit according to a sixth embodiment of the present disclosure.
Figure 7C:
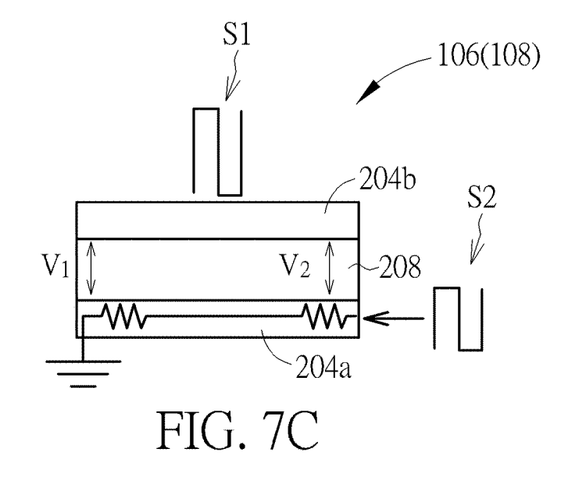
FIG. 7C is a schematic cross-sectional diagram of a viewing angle adjusting subunit according to a sixth embodiment of the present disclosure.

FIG. 7A to FIG. 7C are schematic cross-sectional diagrams of viewing angle adjusting subunits according to the sixth embodiment of the present disclosure. Referring to FIG. 7A to FIG. 7C, there are several examples to let the voltage difference across the modulating layer 208 of the viewing angle adjusting subunits 106 and 108 be reduced from one lateral side to the other lateral side. For example, in FIG. 7A, one of the transparent electrodes 204a and 204b may be electrically grounded (such as the transparent electrode 204a), and the voltage pulses S1 with relatively high amplitude and the voltage pulses S2 with relatively low amplitude may be respectively applied to the opposite lateral sides of the other one of the transparent electrodes 204a and 204b (such as the transparent electrode 204b). Besides, a transmission direction of the voltage pulses S1 may be opposite to a transmission direction of the second voltage pulses S2. Due to the inherent electrical resistance of the transparent electrode 204b and phase difference between the voltage pulses S1 and S2 (such as 180° out of phase), the amplitude of the voltage pulses S1 and the amplitude of the voltage pulses S2 may be reduced during transmitting from one lateral side to another lateral side. Thus, the voltage differences across different regions of the modulating layer 208 may be determined by calculating the voltage differences between the transparent electrodes 204a and 204b at the corresponding regions. For example, a voltage difference V1 at the left-hand side of the modulating layer 208 may be reduced to a voltage difference V2 at the right-hand side of the modulating layer 208.

Referring to FIG. 7B, one of the transparent electrodes 204a and 204b may be a patterned transparent electrode including a plurality of sub-electrodes such as sub-electrodes 204b-1, 204b-2, 204b-3 and 204b-4. The shape of the sub-electrodes may include a triangle, a rectangle, a pentagon, a hexagon, any other suitable shapes, or a combination thereof. The voltage pulses S3, S4, S5, and S6 with reduced amplitudes may be respectively applied to the sub-electrodes 204b-1, 204b-2, 204b-3 and 204b-4. In other words, the amplitude of the voltage pulses S3 may be the largest, while the amplitude of the voltage pulses S5 may be the smallest. Thus, the voltage difference V1 at the left-hand side of the modulating layer 208 may be reduced to a voltage difference V2 at the right-hand side of the modulating layer 208.

Referring to FIG. 7C, one of the transparent electrodes 204a and 204b (such as the transparent electrode 204a) may be configured to receive the voltage pulses S2 from one side, such as right-hand side, while the other one of the transparent electrodes 204a and 204b (such as the transparent electrode 204b) may be configured to receive the voltage pulses S1. Since the voltage pulses S1 and S2 may be 180° out of phase, the voltage difference V1 at the left-hand side of the modulating layer 208 may also be reduced to a voltage difference V2 at the right-hand side of the modulating layer 208.

Figure 8A:
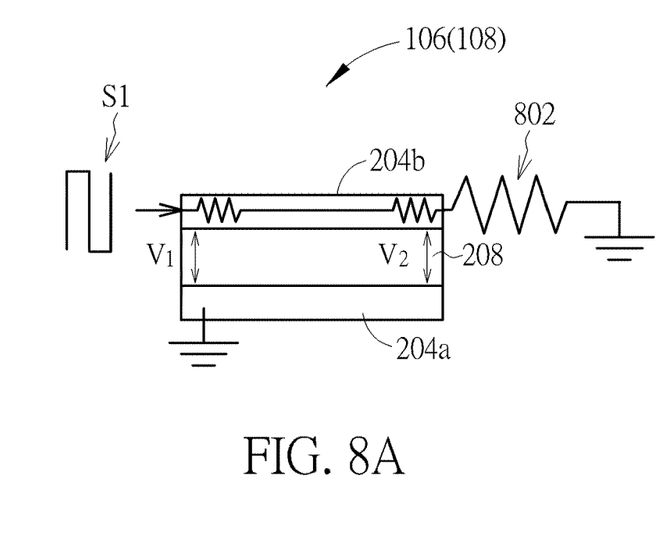
FIG. 8A is a schematic cross-sectional diagram of a viewing angle adjusting subunit according to a seventh embodiment of the present disclosure.
Figure 8B:
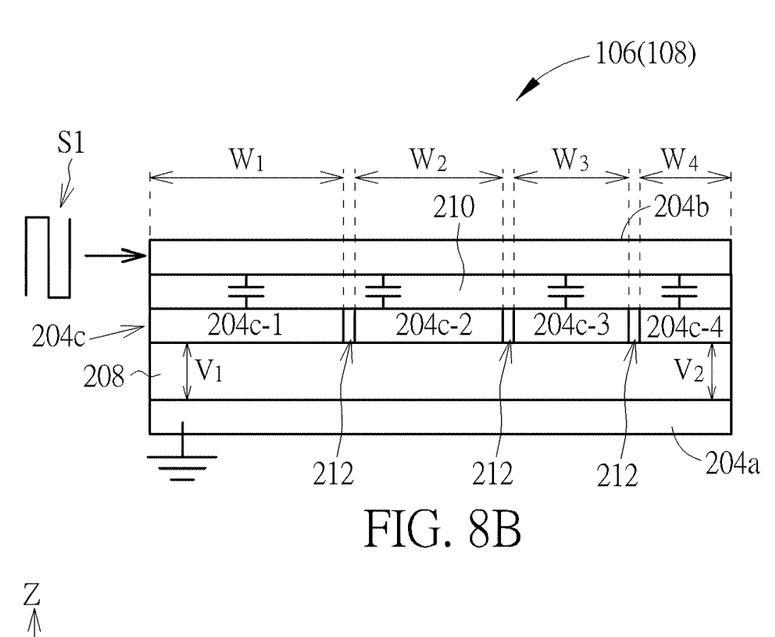
FIG. 8B is a schematic cross-sectional diagram of a viewing angle adjusting subunit according to a seventh embodiment of the present disclosure.

FIG. 8A and FIG. 8B are schematic cross-sectional diagrams of viewing angle adjusting subunits according to the seventh embodiment of the present disclosure. Referring to FIG. 8A, the voltage pulses S1 may be applied to the left-hand side of at least one of the viewing angle adjusting subunits 106 and 108, and the right-hand side of the at least one of the viewing angle adjusting subunits 106 and 108 may be coupled to a resistor 802. Thus, the voltage difference V1 at the left-hand side of the modulating layer 208 may also be reduced to a voltage difference V2 at the right-hand side of the modulating layer 208.

Referring to 8B, an additional transparent electrode 204c may be further disposed between the transparent electrodes 204a and 204b. Besides, the additional transparent electrode 204c may be a patterned transparent electrode including a plurality of sub-electrodes such as sub-electrodes 204c-1, 204c-2, 204c-3 and 204c-4. The shape of the sub-electrodes may include a triangle, a rectangle, a pentagon, a hexagon, any other suitable shapes, or a combination thereof. In one example, the sub-electrodes 204c-1, 204c-2, 204c-3 and 204c-4 may have reduced widths W1, W2, W3 and W4, and there are spacing 212 among the sub-electrodes 204c-1, 204c-2, 204c-3 and 204c-4. Besides, there may be an insulating layer 210 disposed between the transparent electrodes 204b and the additional transparent electrode 204c. When the voltage pulses S1 are applied to the left-hand side of the transparent electrodes 204b, the capacitance generated between the transparent electrode 204b and 204c may be reduced from the left-hand side to the right hand side due to the varying area of the sub-electrodes 204c-1, 204c-2, 204c-3 and 204c-4. For example, the widths W1, W2, W3, and W4 of the sub-electrodes 204c-1, 204c-2, 204c-3 and 204c-4 along a direction may be varied so that the widths W1, W2, W3, and W4 may be reduced from one side of the viewing angle adjusting subunit to another side of the viewing angle adjusting subunit. The width W1 of the sub-electrode 204c-1 may be greater than the width W4 of the sub-electrode 204c-4. As a result, the voltage difference V1 at the left-hand side of the modulating layer 208 may also be reduced to a voltage difference V2 at the right-hand side of the modulating layer 208.

FIG. 9A to FIG. 9D are schematic cross-sectional diagrams of the electronic device with adjustable viewing angles according to an eighth embodiment of the present disclosure. By adjusting the azimuthal angles of the polarization axes of the polarizers 902a, 902b and 902c in the viewing angle adjusting subunits 106 and 108, the electronic device may become a symmetric mode electronic device or an asymmetric mode electronic device.

Figure 9A:
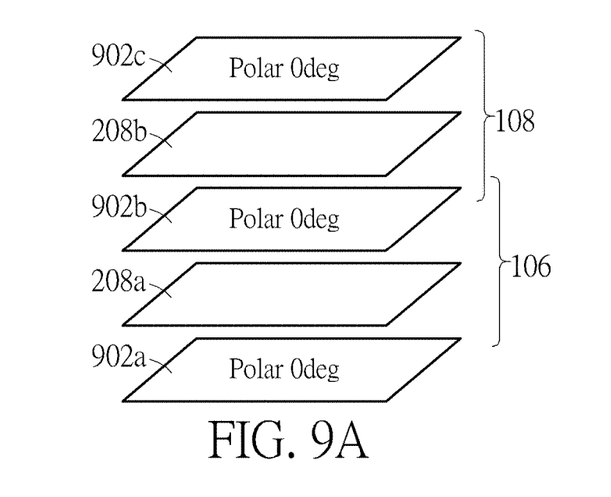
FIG. 9A is a schematic cross-sectional diagram of an electronic device with adjustable viewing angles according to an eight embodiment of the present disclosure.
Figure 9B:
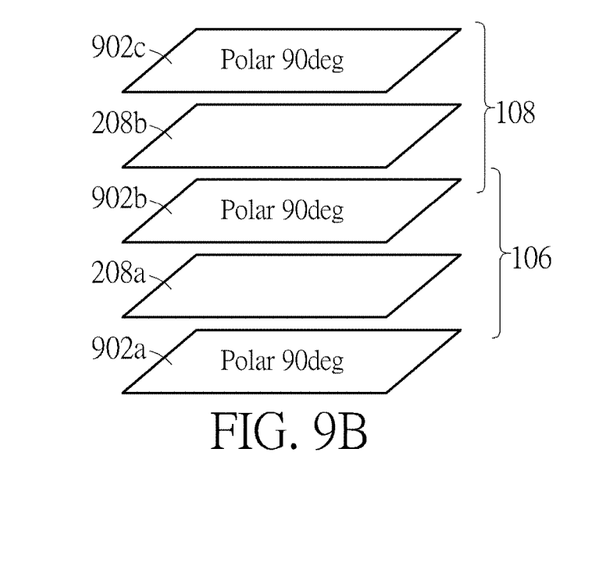
FIG. 9B is a schematic cross-sectional diagram of an electronic device with adjustable viewing angles according to an eight embodiment of the present disclosure.

For example, referring to FIG. 9A and FIG. 9B, the viewing angle adjusting subunit 106 may include the polarizers 902a and 902b and the modulating layer 208a disposed between the polarizers 902a and 902b. The viewing angle adjusting subunit 108 may include the polarizers 902b and 902c and the modulating layer 208b disposed between the polarizers 902b and 902c. When the polarization axes of the polarizers 902a, 902b and 902c are parallel to one another, the electronic device may be operated in a symmetric mode. For example, the polarization axes of the polarizers 902a, 902b and 902c may all be 0° or all be 90°, but not limited thereto. It is noted that at least one of the polarizers of the electronic device may be shared, for example, the polarizer 902b may be shared by the viewing angle adjusting subunits 106 and 108.

Figure 9C:
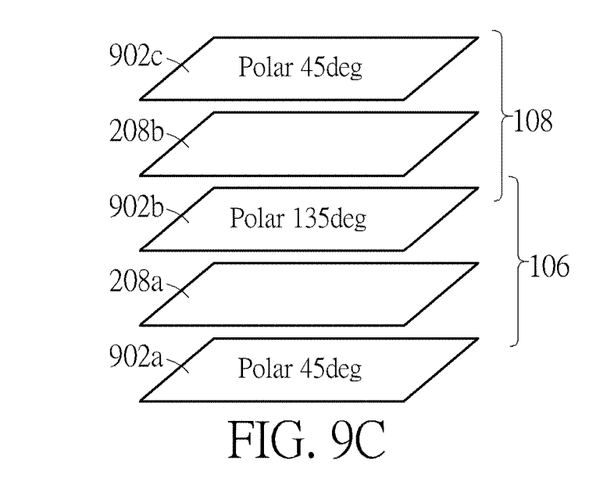
FIG. 9C is a schematic cross-sectional diagram of an electronic device with adjustable viewing angles according to an eight embodiment of the present disclosure.
Figure 9D:
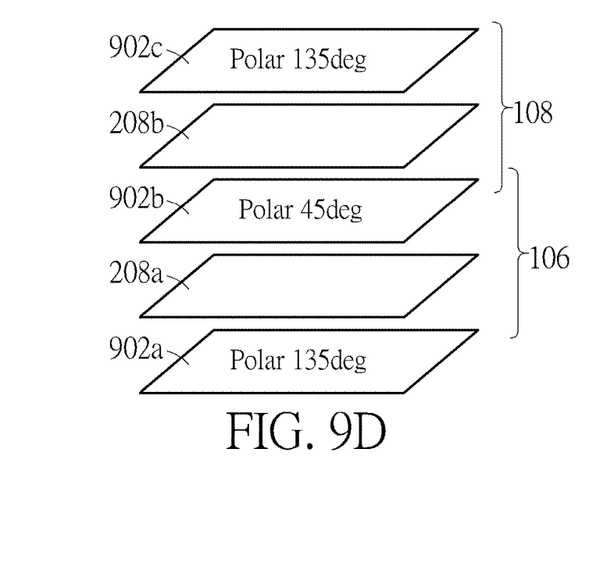
FIG. 9D is a schematic cross-sectional diagram of an electronic device with adjustable viewing angles according to an eight embodiment of the present disclosure.

In contrast, referring to FIG. 9C and FIG. 9D, when the polarization axes of the polarizers 902a and 902c are parallel to each other, and the polarization axis of the polarizers 902b are perpendicular to the polarization axes of the polarizers 902a and 902c, the electronic device may be operated in an asymmetric mode. For example, the polarization axes of the polarizers 902a and 902c may be 45°, and the polarization axes of the polarizers 902b may be 135°, but not limited thereto.

Figure 10C:
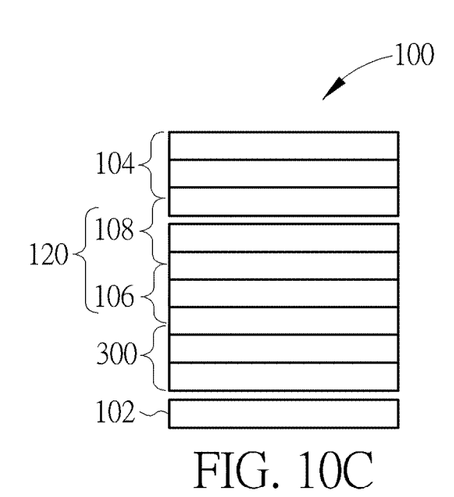
FIG. 10C is a schematic cross-sectional diagram of an electronic device with adjustable viewing angles according to a ninth embodiment of the present disclosure.
Figure 10D:
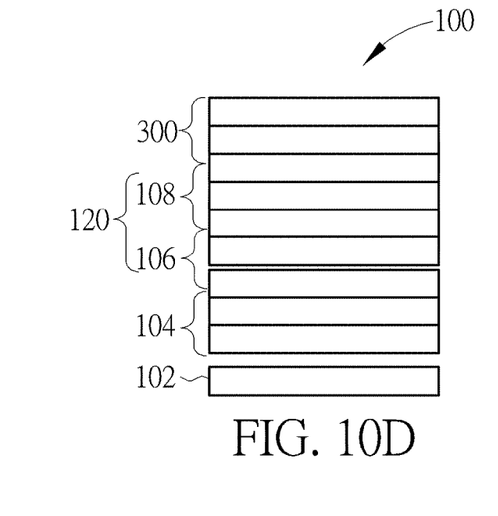
FIG. 10D is a schematic cross-sectional diagram of an electronic device with adjustable viewing angles according to a ninth embodiment of the present disclosure.
Figure 10E:
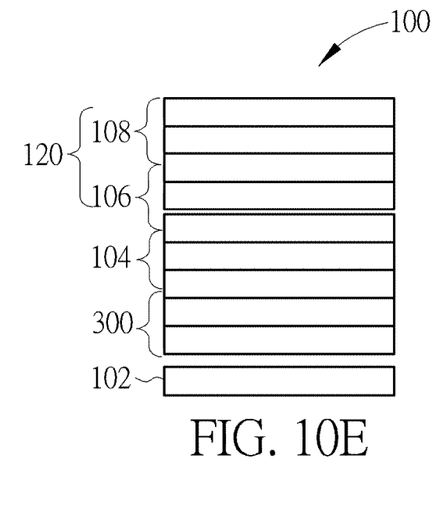
FIG. 10E is a schematic cross-sectional diagram of an electronic device with adjustable viewing angles according to a ninth embodiment of the present disclosure.
Figure 10F:
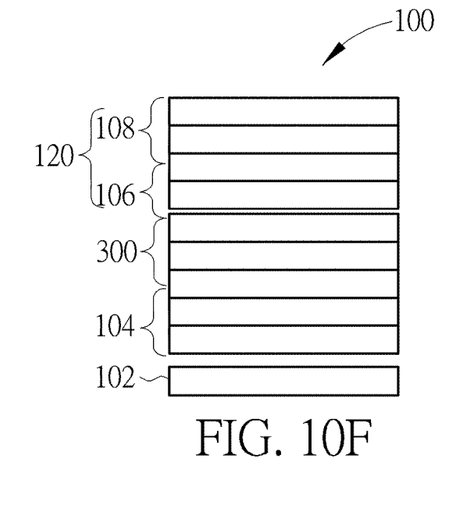
FIG. 10F is a schematic cross-sectional diagram of an electronic device with adjustable viewing angles according to a ninth embodiment of the present disclosure.

FIG. 10A to FIG. 10F are schematic cross-sectional diagrams of electronic device with adjustable viewing angles according to ninth embodiment of the present disclosure. According to this embodiment, there are several exemplary arrangements of the backlight module 102, the display panel 104, the viewing angle adjusting unit 120, and the light restriction film 300 in the electronic device 100. For example, referring to FIG. 10A and FIG. 10B, the viewing angle adjusting unit 120 may be disposed under the light restriction film 300. However, the positions of the display panel 104 and the light restriction film 300 may be exchanged for FIG. 10A and FIG. 10B. Referring to FIG. 10C and FIG. 10D, the viewing angle adjusting unit 120 may be disposed between the display panel 104 and the light restriction film 300. However, the positions of the display panel 104 and the light restriction film 300 may be exchanged for FIG. 10C and FIG. 10D. Referring to FIG. 10E and FIG. 10F, the viewing angle adjusting unit 120 may be disposed on the display panel 104 and the light restriction film 300. However, the positions of the display panel 104 and the light restriction film 300 may be exchanged for FIG. 10E and FIG. 10F. In some embodiments, for FIG. 10D and FIG. 10F, the backlight 102 may be omitted when the display panel 104 includes organic light-emitting diodes, inorganic light-emitting diodes, mini light-emitting diodes, micro light-emitting diodes, quantum dot light-emitting diodes, or a combination thereof, but not limited thereto.

Figure 11B:
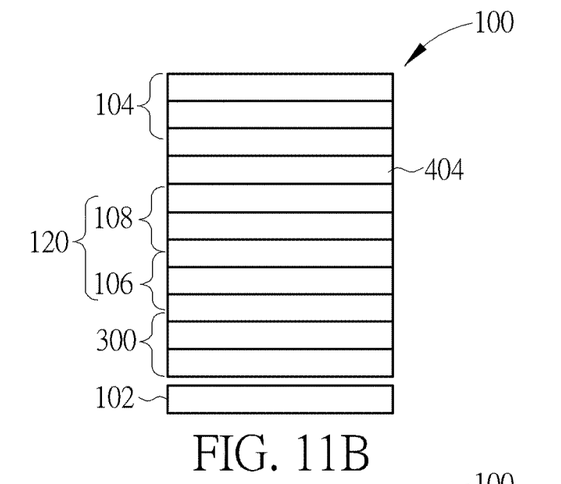
FIG. 11B is a schematic cross-sectional diagram of an electronic device with adjustable viewing angles according to a tenth embodiment of the present disclosure.
Figure 11C:
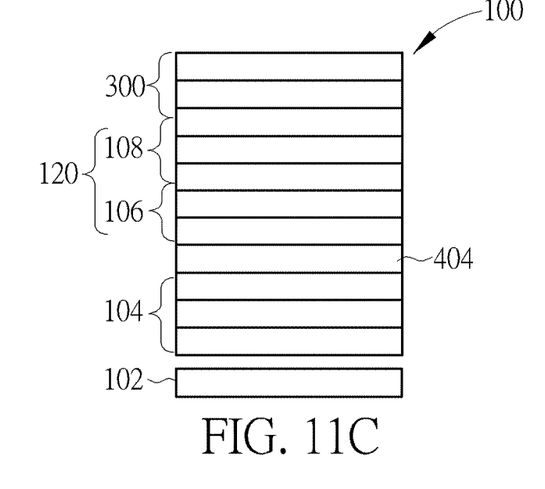
FIG. 11C is a schematic cross-sectional diagram of an electronic device with adjustable viewing angles according to a tenth embodiment of the present disclosure.
Figure 11D:
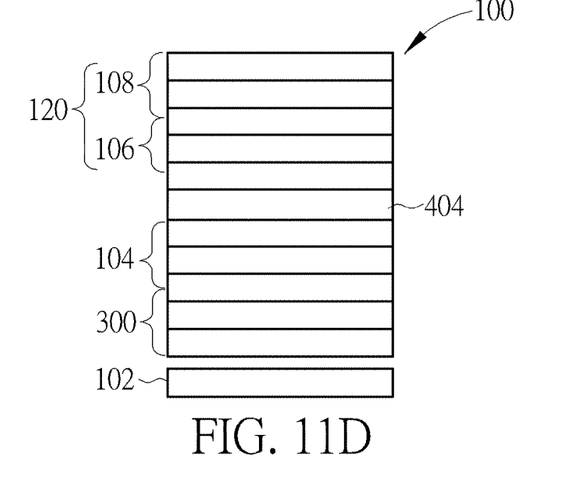
FIG. 11D is a schematic cross-sectional diagram of an electronic device with adjustable viewing angles according to a tenth embodiment of the present disclosure.

FIG. 11A to FIG. 11D are schematic cross-sectional diagrams of electronic device with adjustable viewing angles according to tenth embodiment of the present disclosure. According to this embodiment, there are exemplary arrangements of the backlight module 102, the display panel 104, the viewing angle adjusting unit 120, the light restriction film 300, and the half-wave plate 404 in the electronic device 100. For example, referring to FIG. 11A, the viewing angle adjusting unit 120, the half-wave plate 404, the display panel 104, and the light restriction film 300 may be sequentially stacked on the backlight module 102. Referring to FIG. 11B, the light restriction film 300, the viewing angle adjusting unit 120, the half-wave plate 404, and the display panel 104 may be sequentially stacked on the backlight module 102. Referring to FIG. 11C, the display panel 104, the half-wave plate 404, the viewing angle adjusting unit 120, and the light restriction film 300 may be sequentially stacked on the backlight module 102. Referring to FIG. 11D, the light restriction film 300, the display panel 104, the half-wave plate 404, and the viewing angle adjusting unit 120 may be sequentially stacked on the backlight module 102. The half-wave plate 404 may decrease the light loss between the viewing angle adjusting unit 120 and the display panel 104, and the occurrence of the light loss may be due to the mismatch between the polarization axes of the viewing angle adjusting unit 120 and the display panel 104.

According to the electronic device of the present disclosure, the viewing angle adjusting unit and the retardation structure are incorporated in the electronic device. Therefore, in the private mode, the brightness of the image from the electronic device may become low at a large viewing angle with respect to the normal direction of the electronic device. Besides, the use of the retardation structure may decrease the occurrence of moiré pattern.

Although some embodiments of the present disclosure and their advantages have been described in detail, it should be understood that various changes, substitutions and alterations can be made herein without departing from the spirit and scope of the disclosure as defined by the appended claims. For example, it will be readily understood by one of ordinary skill in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, each of the claims constitutes an individual embodiment, and the scope of the disclosure also includes the scope of the various claims and combinations of the embodiments. The scope of the disclosure is subject to the definition of the scope of the claims.

What is claimed is:

1. An electronic device, comprising:
a backlight module;
a display panel, disposed on the backlight module;
a viewing angle adjusting unit disposed on the backlight module, wherein the viewing angle adjusting unit comprises a first viewing angle adjusting subunit and a second viewing angle adjusting subunit, and the first viewing angle adjusting subunit is disposed between the backlight module and the second viewing angle adjusting subunit; and
a retardation structure, disposed on the backlight module, wherein the first viewing angle adjusting subunit comprises a first modulating layer, the second viewing angle adjusting subunit comprises a second modulating layer, and a polarizer is disposed between the first modulating layer and the second modulating layer,
wherein the viewing angle adjusting unit comprises a bottom polarizer disposed close to the backlight module and a top polarizer disposed away from the backlight module, and a polarization axis of the bottom polarizer is parallel to a polarization axis of the top polarizer.

2. The electronic device of claim 1, wherein the display panel is a liquid crystal display panel.

3. The electronic device of claim 1, wherein a polarization axis of the polarizer disposed between the first modulating layer and the second modulating layer is parallel to the polarization axes of the bottom polarizer and the top polarizer.

4. The electronic device of claim 1, wherein an azimuthal angle between a polarization axis of the polarizer disposed between the first modulating layer and the second modulating layer and the polarization axis of the bottom polarizer is 90 degrees or −90 degrees.

5. The electronic device of claim 1, wherein the first viewing angle adjusting subunit comprises two opposite transparent electrodes.

6. The electronic device of claim 5, wherein one of the transparent electrodes is electrically grounded.

7. The electronic device of claim 5, wherein at least one of the transparent electrodes is a patterned transparent electrode comprising a plurality of sub-electrodes.

8. The electronic device of claim 7, wherein the patterned transparent electrode comprises a plurality of sub-electrodes with different widths along a direction.

9. The electronic device of claim 8, wherein the widths of the sub-electrodes are reduced from one side of the first viewing angle adjusting subunit to another side of the first viewing angle adjusting subunit.

10. The electronic device of claim 5, wherein the first viewing angle adjusting subunit further comprises a modulating layer disposed between the two opposite transparent electrodes, and voltage differences across the modulating layer are reduced when a voltage signal is applied to at least one of the two opposite transparent electrodes.

11. The electronic device of claim 1, wherein at least one of the first viewing angle adjusting subunit and the second viewing angle adjusting subunit is configured to receive a first voltage signal and a second voltage signal, and a transmission direction of the first voltage signal is opposite to a transmission direction of the second voltage signal.

12. The electronic device of claim 11, wherein an amplitude of the first voltage signal is greater than an amplitude of the second voltage signal.

13. The electronic device of claim 1, further comprising a first polarizer and a second polarizer disposed on opposite surfaces of the retardation structure.

14. The electronic device of claim 13, further comprising a half-wave plate disposed between the display panel and the viewing angle adjusting unit.

15. The electronic device of claim 14, wherein a retardation of the half-wave plate is ranged from 200 nm to 350 nm.

16. The electronic device of claim 15, wherein a relationship among the half-wave plate and the first polarizer and the second polarizer is represented as follows:

$$\Theta_h=[(\Theta_1+\Theta_2)/2]+(0° \text{ or } 90°)\pm10°$$

wherein $\Theta_h$ represents an azimuthal angle between a slow axis of the half-wave plate and a reference orientation;

$\Theta_1$ represents an azimuthal angle between a polarization axis of the first polarizer and the reference orientation, and $\Theta_2$ represents an azimuthal angle between a polarization axis of the second polarizer and the reference orientation.

17. An electronic device, comprising:
a display panel;
a viewing angle adjusting unit disposed on the display panel, wherein the viewing angle adjusting unit comprises a first viewing angle adjusting subunit and a second viewing angle adjusting subunit disposed on the first viewing angle adjusting subunit; and
a retardation structure, disposed on the display panel,
wherein the first viewing angle adjusting subunit comprises a first modulating layer, the second viewing angle adjusting subunit comprises a second modulating layer, and a polarizer is disposed between the first modulating layer and the second modulating layer,
wherein the viewing angle adjusting unit comprises a bottom polarizer disposed close to the display panel and a top polarizer disposed away from the display panel, and a polarization axis of the bottom polarizer is parallel to a polarization axis of the top polarizer.

* * * * *